United States Patent [19]
Rau et al.

[11] Patent Number: 5,432,667
[45] Date of Patent: Jul. 11, 1995

[54] NEUTRAL-TO-GROUND FAULT SENSING CIRCUIT

[75] Inventors: C. Peter Rau, Apalacin; Jeffry M. Bulson, Owego, both of N.Y.

[73] Assignee: Emerson Electric Co., St. Louis, Mo.

[21] Appl. No.: 125,735

[22] Filed: Sep. 24, 1993

[51] Int. Cl.⁶ ............................................. H02H 9/00
[52] U.S. Cl. ..................................... 361/124; 361/56; 361/91; 361/127
[58] Field of Search ............... 361/56, 91, 111, 118, 361/104, 127, 124

[56] References Cited
U.S. PATENT DOCUMENTS
4,587,588 5/1986 Goldstein ............................ 361/56

Primary Examiner—Marc S. Hoff
Assistant Examiner—S. Jackson
Attorney, Agent, or Firm—Polster, Lieder, Woodruff & Lucchesi

[57] ABSTRACT

A transient voltage surge suppressor (10) is used in a single or poly-phase power distribution network (P). The surge suppressor connects in parallel between each phase (A, B, C) and neutral (N), each phase and electrical ground (G), and between neutral and ground. An improvement comprises an electrical circuit (30) for monitoring the loss of surge protection due to the occurrence of a current surge or voltage transient in a neutral-to-ground path (32). An MOV-type semiconductor (VR1) is connected in the ground-to-neutral path. The semiconductor is normally non-conducting, but switches into conduction when its voltage threshold is exceeded by a surge current or voltage transient. An excessive surge or transient causes the semiconductor to fail. Respective fuses (F1A, F2B) are connected in series with the semiconductor. These fuses clear (blow) upon a semiconductor failure to create an open circuit neutral-to-ground path. An indicator lamp (20) provides an indication of loss of surge protection due to an excessive surge or transient. A semiconductor switch (42) controls lamp operation. The switch normally maintains the lamp in an ON state, but the switch is responsive to the fuses clearing to switch the lamp OFF. This is indicative of a loss of surge protection on the neutral-to-ground mode. An isolation element (44) is connected in the neutral-to-ground path and responds to clearing of the fuses to switch the semiconductor switch from ON to OFF.

29 Claims, 2 Drawing Sheets

NEUTRAL-TO-GROUND FAULT SENSING CIRCUIT

BACKGROUND OF THE INVENTION

This invention relates to transient voltage surge suppression (TVSS) and, more particularly, to a ground to neutral fault sensing apparatus for use in a transient voltage surge suppressor.

Transient voltage surge suppressors are used to protect electrical components and systems from electrical transients and surges. They are used with computers and similar electronic equipment to prevent system upset as well as catastrophic failures caused by lightning, for example. Typically, TVSS components are connected in parallel to power distribution lines to protect the electrical loads represented by this equipment from damage. A description of a modular TVSS for this type of protection may be found in U.S. patent application 08/109,815 filed Aug. 19, 1993 and assigned to the same assignee as the present application.

One critical element of any TVSS unit is monitoring the integrity of the surge protective components. TVSS modules such as those disclosed in the co-pending patent application 08/109,815 include components such as metal oxide varistors (MOV's) which operate in a non-linear manner. That is, they switch from an OFF to an ON mode of operation when their threshold voltage level is exceeded. When ON, their resistance goes from a very high value to a very low value. In the circuit configuration in which they are connected, they then serve to effectively divert surge currents away from the protected load and clamp transient voltages.

MOV's used in TVSS modules are limited as to the amount of current they can divert. For example, a disk type MOV having a diameter of 20 mm is capable of diverting a 20 microsecond pulse having a peak amplitude of up to 6,500 amps. If the peak current exceeds this value, the MOV may fail. When a MOV fails, its typical failure mode is to fail short. Even after its failure, if it has failed short, it will continue to draw current due to the line voltage, heat up, and then explode catastrophically. This results in an open circuit. To prevent this from occurring, an appropriately sized fuse is connected in series with the MOV. Now, if the MOV shorts, the current drawn by the MOV is sufficient to clear the fuse. This results in an open circuit but not one produced by a catastrophic MOV failure which could cause other damage. Also, if the surge current is significantly higher than the maximum allowable for the MOV, the fuse may clear before the MOV fails short. For surge protection between neutral and ground there is no follow current.

When a TVSS is installed so as to provide phase-to-neutral, phase-to-ground, or phase-to-phase protection, a phase voltage between a fuse link and the MOV can be monitored. If the MOV fails, subsequent clearing of its associated fuse results in a reduced voltage. This voltage reduction is a clear indication of MOV failure and the need for appropriate action. However, for a TVSS installed between ground and neutral, a phase voltage which indicates MOV failure cannot be monitored. What is needed therefore is a fault sensing circuit which provides a clear and unequivocal indication of when a surge or transient has caused an MOV failure between neutral and ground.

SUMMARY OF THE INVENTION

Among the several objects of the present invention may be noted the provision of a neutral-to-ground fault sensing circuit; the provision of such a circuit which is usable in a TVSS module installed in a power distribution network to protect electrical equipment connected to the network; the provision of such a circuit to provide a clear and unequivocal indication of the loss of surge protection due to excessive current or a voltage transient in the neutral-to-ground path of the network; the provision of such a circuit to provide a visual indication when a fault has occurred; the provision of such a circuit to effectively control the switching of an opto-isolator which, in turn, controls an illumination source providing the fault indication; the provision of such a circuit to employ a multiple, split fuse arrangement for fault detection; the provision of such a circuit in which the fuses comprise substantially pure silver links; the provision of such a circuit which is readily installed in a TVSS module and embedded in a sand, this increasing the probability that all fuses clear during a single surge or transient; and, the provision of such a circuit in which a sense voltage monitored by the circuit is provided by a network phase.

In accordance with the invention, generally stated, a transient voltage surge suppressor is for use in a single or poly-phase power distribution network. A surge suppressor module may be connected in parallel between each phase and an adjacent phase, each phase and neutral, each phase and electrical ground, and between neutral and ground. An improvement comprises an electrical circuit for monitoring the loss of surge protection due to the occurrence of an excessive current surge or voltage transient in a neutral-to-ground path. Further, the circuit provides an indication of the loss of surge protection due to an excessive surge or transient. An MOV-type semiconductor is connected in series in the ground-to-neutral path. The semiconductor is normally non-conducting but is switched into conduction when its voltage threshold is exceeded by a surge current or a transient voltage. An excessive surge or transient may cause the semiconductor to fail. Respective fuses are connected in series with the semiconductor. These fuses clear upon a failure of the semiconductor to create an open neutral-to-ground path. An indicator lamp provides an indication of the loss of surge protection due to an excessive surge or transient having occurred. A semiconductor switch controls the operation state of the lamp. The switch normally maintains the lamp in a first operating state (ON); but the switch is responsive to clearing of the fuses to switch the lamp to a second operating state (OFF) which is indicative of the loss of surge protection due to the excessive current surge or voltage transient having occurred. Other objects and features will be in part apparent and in part pointed out hereinafter.

DESCRIPTION OF A PREFERRED EMBODIMENT

A transient voltage surge suppressor 10 is described in co-pending U.S. patent application 08/109,815, filed Aug. 19, 1993 and assigned to the same assignee as the present application.

Figure 1:
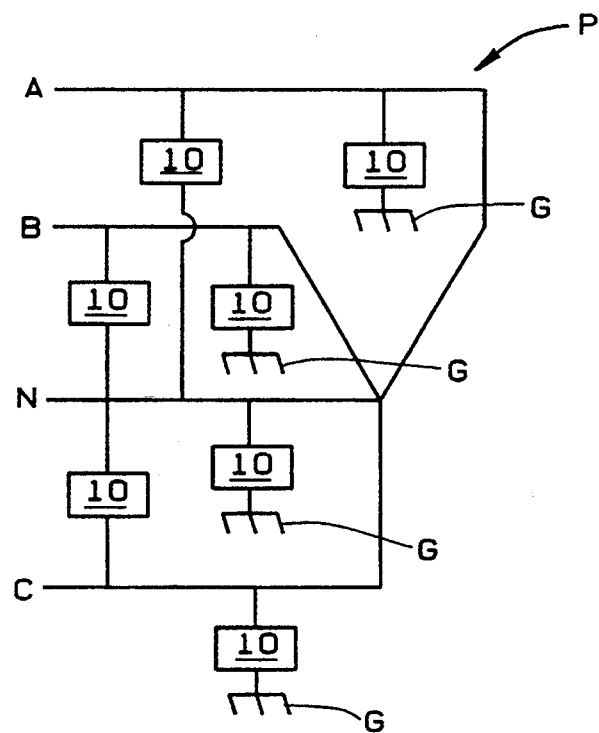
FIG. 1 illustrates the connection of a TVSS in a typical electrical power distribution network.

FIG. 1 illustrates a 3-phase power distribution network P in which a TVSS may be employed. Network P is shown to be a Y-type network; although it will be understood that the TVSS can also be used in delta 3-phase networks as well as in other single and polyphase power distribution schemes. Y-type network P has phases A, B, and C, a neutral line N, and a common electrical ground G. As shown in FIG. 1, a TVSS maybe connected between each of the phases and neutral, between each of the phases and ground, and between neutral and ground.

As described in the above referenced co-pending application, each module includes circuitry which is responsive to current surges and voltage transients to which the network is subjected. This circuitry includes semiconductor components such as metal oxide varistors (MOV's). These elements have a voltage threshold which, when exceeded by a surge or transient, switches them from their normally OFF mode to an ON mode. When switched ON, the resistance of the MOV creates a low impedance circuit path which effectively diverts the surge current away from sensitive electrical equipment connected to the network, and clamps the transient voltage to a safe level.

As previously mentioned, MOV's are limited as to the amount of current they can divert. When the upper limit of their diversion capabilities are exceeded due to a particularly strong current surge or voltage transient, they may fail. The typical failure mode of an MOV is to fail as a short. Because the MOV fails as a short it will continue to draw current if connected between phases or between a phase and neutral or ground. Drawing current causes the MOV to heat up, and if the MOV gets sufficiently hot, it may explode. This results in an open circuit. To prevent this from occurring, an appropriately sized fuse is connected in series with the MOV. Now, when the MOV shorts, current drawn by the MOV is sufficient to clear (blow) the fuse. An open circuit is still produced, but the potential catastrophic effects of an exploding MOV are avoided.

Figure 2A:
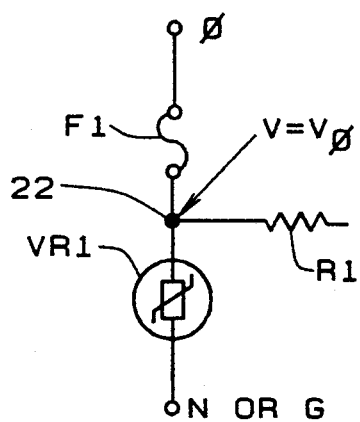
FIGS. 2A and 2B are partial schematics illustrating fault sensing for phase protection in a TVSS module.
Figure 2B:
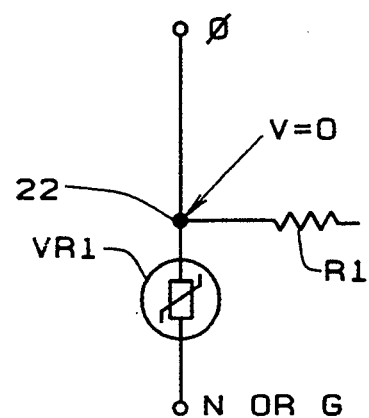

Referring to FIG. 2A, a portion of a fault detection circuit as used in a TVSS 10 is shown. As shown, an MOV VR1 is series connected with a fuse link F1. One side of the fuse link is connected to the phase side of the module, and one side of the MOV is wired to the ground G or neutral N connection of the module. A resistor R1 is connected to a common point 22 between the MOV and fuse link. In FIG. 2A, under normal conditions, the voltage at junction 22 equals the instantaneous phase voltage for that phase. Resistor R1 is part of a fault monitoring circuit. Consequently, so long as the MOV is functioning, a voltage is present at the junction and is sensed by the fault detection circuit. FIG. 2B represents the above described situation where the MOV has failed short and fuse link F1 has cleared. Since the fuse link was on the phase side of the circuit, the voltage at the common point is now zero. This voltage reduction is sensed by the fault detection network which responds by providing an appropriate indication.

While the above circuitry works for TVSS 10 installations between any phase and either neutral or ground, it cannot be used for a TVSS 10 connected between neutral and ground because the source voltage provided by the phase connection to the protected circuit is no longer there. Consequently, fault sensing must be performed in a different manner.

Figure 3:
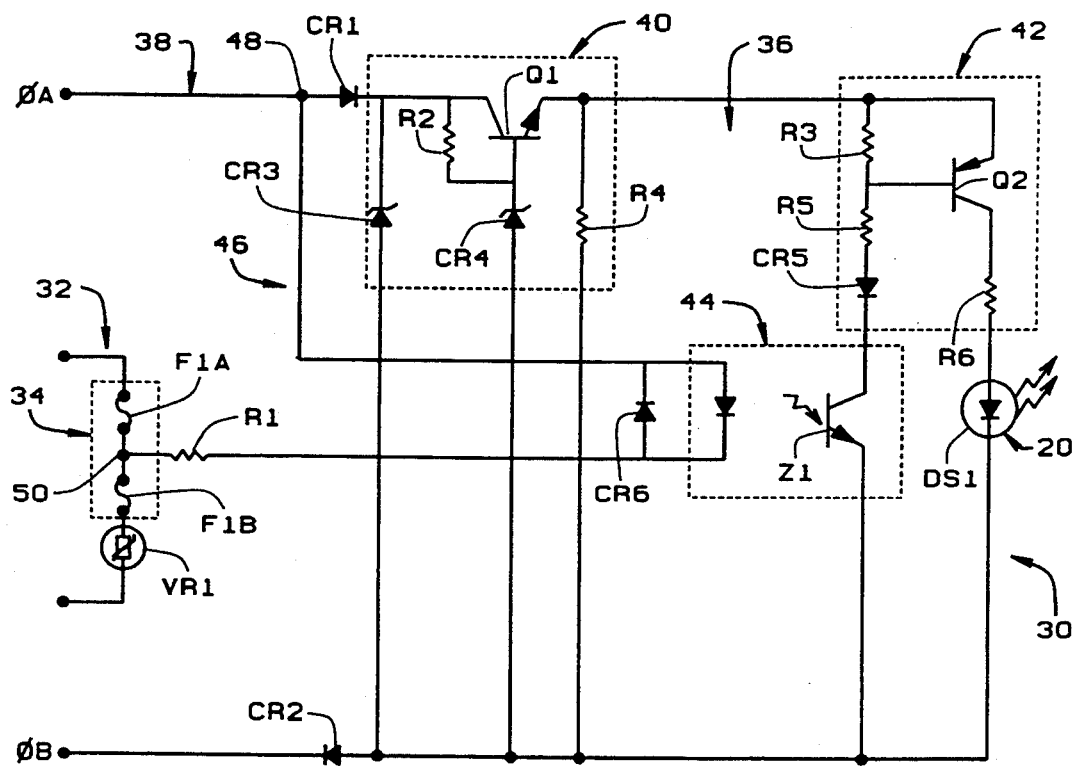
FIG. 3 is a schematic of the fault sensing and fault logic circuit of the present invention for neutral-to-ground protection; and, FIG. 4A is an elevational view of a printed circuit board on which a portion of the circuit of the present

An electrical circuit of the present invention for use in a TVSS connected in parallel with a path between neutral and ground in network P is indicated generally 30 in FIG. 3, or in similar networks with neutral and ground conductors. Circuit 30 monitors the integrity of the surge protection component(s) in the neutral-to-ground path and, as with the above described circuitry for the other network connections, provides an indication of the loss of surge protection due to an excessive current surge or voltage transient. Circuit 30 first includes a semiconductor device VR1. The MOV is connected in series in a ground-to-neutral circuit path 32 which extends through the TVSS 10. As above described, MOV VR1 is normally in a non-conducting or OFF state. It is, however, switched into its conducting or ON state when an established voltage threshold is exceeded by a transient voltage. Also as previously described, MOV VR1 may fail when exposed to an excessive surge current or transient voltage.

Circuit 30 next includes fuse means 34. Means 34 comprises a first fuse link F1A and a second fuse link F1B. Both fuse links are formed of a substantially pure silver wire, the wire being, for example, 99.9% pure silver. Fuse links F1A and F1B are series connected with MOV VR1. As shown in FIG. 3, one side of the MOV is connected to the ground side of path 32. Fuse links F1A and F1B are concatenated links with one end of fuse link F1A being connected to a second side of MOV VR1, while one end of the other fuse link F1B is connected to the neutral side of circuit path 32. In the event MOV VR1 fails as a short, both fuse links F1A and F1B will clear. This then creates an open circuit in neutral-to-ground path 32.

Circuit 30 includes means indicated generally 36 by which failure of MOV VR1 and clearing of fuse links F1A and F1B produces a visual indication thereof. Lamp 20 of the module, as noted, provides the visual indication, and the lamp 20 is implemented by a light emitting diode (LED) DS1. As shown in FIG. 3, circuit 30 includes a circuit path 38 between two of the power distribution network phases. LED DS1 is connected in this circuit path. In FIG. 3, this connection is made between the A and B phases of the network. It will be understood, however, that connection could also be between the A and C or B and C phases. Respective diodes CR1 and CR2 are connected in the circuit to provide rectification.

Circuit 30 includes a constant current source 40 which includes a NPN transistor Q1 having its collector-emitter circuit connected in circuit path 38. The base of the transistor is biased by a resistor R2. A zener diode CR3 is connected between the legs of circuit path 38 to regulate the voltage to a predetermined value. The cathodes of diodes CR1 and CR3, and the collector of transistor Q1 are commonly connected, as is one side of resistor R2. The cathode of a second zener diode CR4 is connected to the base of transistor Q1 together with the other side of the bias resistor. A load resistor R4 is connected between the emitter of transistor Q1 and the opposite leg of circuit path 38. The anodes of diodes CR2, CR3, and CR4, are connected in common with one side of this resistor.

The constant current output of source 40 is supplied to the LED via a transistor means 42. The switch transistor, as is described, controls operation of indicator lamp means 20 and normally maintains the LED in a light emitting state. Means 42, however, switches the LED to a non-emitting state in response to the loss of surge protection due to the occurrence of an excessive surge or transient. Means 42 includes a PNP transistor Q2 whose emitter-collector circuit is in circuit path 38. The collector of transistor Q2 is connected to the LED through a resistor R6. A bias resistor R3 is connected between a common point for load resistor R4 and the emitter of transistor Q1, and the base of transistor Q2.

Circuit 30 includes an isolation means 44 for controlling the operation of transistor Q2 and consequently the operational state of the LED. Means 44 comprises an opto-isolator Z1 whose output is connected to the base of transistor Q2 through a series connected diode CR5 and resistor R5. A current path 46 for the opto-isolator extends from a junction point 48 on circuit path 38, this junction being to the anode side of diode CR1. The path extends through the opto-isolator and resistor R1 to a common point 50 between fuse links F1A and F1B. A diode CR6 is connected across the path in parallel with the opto-isolator.

Operation of circuit 30 is such that so long as MOV VR1 is operating, current flows through path 46. Opto-isolator 44 conducts and in doing so biases transistor Q2 to its conducting or ON state. If the MOV fails short, clearing of the fuse links creates an open circuit for the opto-isolator. With path 46 open, the opto-isolator is taken out of conduction. This, in turn, switches transistor Q2 OFF, interrupting current flow to the LED. The LED, which was emitting light now no longer does so. An observer noting that lamp 20 is extinguished, then knows that a fault has occurred and that remedial action should be taken.

Figure 4A:
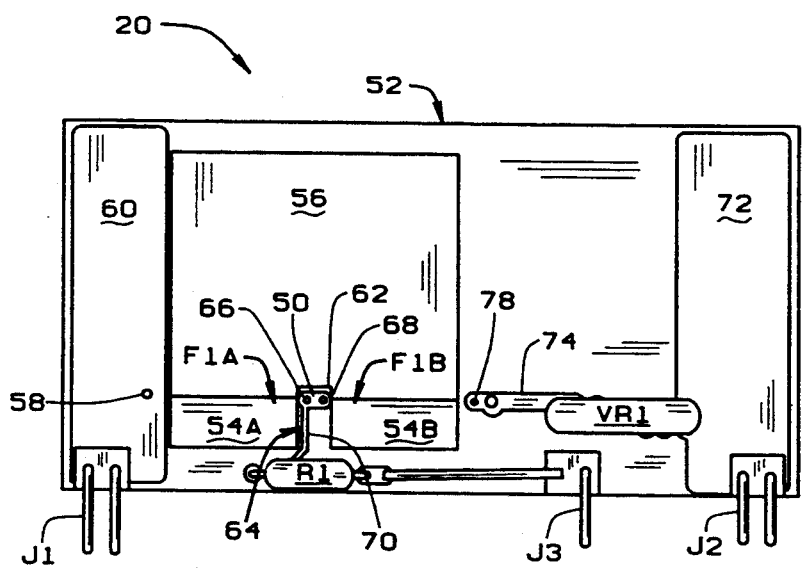

Referring to FIG. 4A, installation of the above described circuit elements in a TVSS is illustrated. As shown in FIG. 4A, a portion of circuit 30 is incorporated on printed circuit board (PCB) 52. The physical arrangement of PCB's in a TVSS is described in detail in the co-pending application 08/109,815, and will not be described herein. PCB 52 has first electrical connector J1 which is a two-pronged connector that connects to the neutral contact of the module. A second two-pronged connector J2 is connected to the ground contact of the module. Respective fuse links F1A and F1B comprise respective substantially pure silver wires 54A, 54B. Fuse link F1A has an electrical contact 58 with an electrically conducting strip 60 which extends along one side of the PCB.

A substrate 56 has a rectangular cut-out 62 formed therein to separate the two fuse links. A tee shaped circuit path 64 extends across this cut-out. Each fuse link is connected to a respective side of the base of the tee shaped circuit path by electrical contacts 66, 68. A leg 70 of circuit path 64 connects to one side of resistor R1. The point where this leg joins the head of the tee comprises the common point 50 designated in the circuit of FIG. 3. The other side of resistor R1 is electrically connected to a single pronged connector J3. Connector J3 is used to connect PCB 52 to another PCB (not shown) on which are installed the other components of circuit 30; i.e., current source 40, transistor means 42, switch means 44, and their associated components.

Figure 4B:
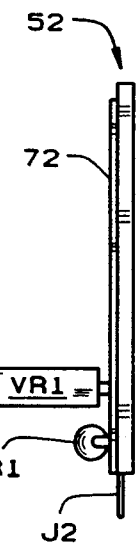

MOV VR1 is a disk-shaped element which, when attached to the PCB extends outwardly from the PCB as shown in FIG. 4B. MOV VR1 has one side attached to an electrical conducting strip 72 which extends along the opposite edge of the PCB from strip 60 for connecting to electrical ground. The other side of the MOV is connected to a conductor strip 74 which extends between the MOV and fuse link F1B. Fuse link F1B is connected to this side of the MOV by an electrical contact.

PCB 52 is installed as part of a TVSS installation. Once the PCB is installed, together with other PCB's, the cover is filled with sand which is compacted. Any remaining volume in the cover is then filled with an epoxy sealing material. Use of the sand an epoxy prevents any plasma which may be created by failure of MOV VR1 or clearing of the fuse links from propagating through the module. This is described in more detail in the co-pending application 08/109,815. When installed, lamp 20 is normally illuminated in accordance with the above described operation of circuit 30. The lamp provides a positive indication that the module is fully operational to protect that portion of the power distribution network to which it is connected. When, however, an excessive current surge or voltage transient destroys MOV VR1 so it can no longer provide a low impedance current path or voltage clamping, this is signalled by the lamp being extinguished. The person monitoring the modules then knows to replace the module with a new one.

What has been described is a neutral-to-ground fault sensing circuit. The circuit is usable in a TVSS installed in a power distribution network which protects electrical equipment connected to the network. The circuit provides a clear visual indication when a fault caused by excessive current or a voltage transient in the neutral-to-ground path of the network has occurred. In operation, the circuit effectively controls switching of an opto-isolator that operates the illumination source providing the fault indication. The circuit employs a split fuse arrangement for fault detection with the fuses being made of substantially pure silver. The circuit is readily installed in a TVSS module and is embedded in a sand. This type of installation increases the probability that all fuses comprising the split fuse arrangement clear during a single surge or transient. Also, the circuit monitors a voltage which is provided by a network phase.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. In a transient voltage surge suppressor for use in a single or poly-phase power distribution network, the suppressor being connectable in parallel between each phase and neutral, each phase and electrical ground, and between neutral and ground, the improvement comprising an electrical circuit for monitoring the loss of surge protection due to the occurrence of a current surge or voltage transient in a neutral-to-ground path and for providing an indication of surge protection integrity if an excessive surge or transient occurs, said circuit including:

semiconductor means connected in the ground-to-neutral path, said semiconductor means being normally non-conducting but switched into conduction when the voltage threshold is exceeded by a transient voltage, the semiconductor means failing if the surge or transient is excessive;

fuse means connected in series with said semiconductor means, said fuse means clearing upon failure of the semiconductor means to create an open circuit neutral-to-ground path;

indicator means for providing an indication of a loss of surge protection due to a surge or transient having occurred; and, switch means for controlling operation of said indicator means, said switch means normally maintaining said indicator means in a first operating state, but said switch means being responsive to clearing of the fuse means to switch to indicator means to a second operating state indicative of the occurrence of loss of surge protection due to an excessive surge or transient.

2. The improvement of claim 1 wherein said semiconductor means comprises a metal oxide varistor (MOV) semiconductor.

3. The improvement of claim 2 said fuse means comprises a first fuse link and a second fuse link series connected with each other and with said MOV.

4. The improvement of claim 3 wherein each fuse link is formed of a substantially pure silver wire.

5. The improvement of claim 3 wherein said one end of said first fuse link is connected to said neutral, the other end of said first fuse link is connected to one end of said second fuse link, said other end of said second fuse link is connected to one side of said MOV, and a second side of said MOV is connected to said ground.

6. The improvement of claim 3 wherein one side of said MOV is connected to one of said ground or neutral, and said fuse links are concatenated with one end of one of said fuse links being connected to a second side of said MOV with one end of the other of said fuse links being connected to the other of said neutral or ground.

7. The improvement of claim 5 wherein said indicator means includes a lamp and transistor means for switching the lamp into and out of conduction.

8. The improvement of claim 7 wherein said lamp comprises a light emitting diode (LED) and said transistor means controls current flow through the LED.

9. The improvement of claim 7 wherein said switch means includes an opto-isolator whose output is connected to said transistor means, said opto-isolator, when conducting, switching said transistor means into conduction which causes the LED to emit light.

10. The improvement of claim 9 wherein one side of said opto-isolator is connected to a power source, and the other side thereof is connected in said ground-to-neutral path.

11. The improvement of claim 10 wherein said other side of said opto-isolator is connected to said ground-to-neutral path at a common point between said fuse links whereby clearing of the fuse links creates an open circuit for said opto-isolator, said opto-isolator going out of conduction when said open circuit occurs thereby taking said transistor means out of conduction and causing the LED to stop emitting light.

12. The improvement of claim 1 further including rectification means for providing an indication logic bias for said indicator means.

13. The improvement of claim 12 further including source means for producing a constant current source for said switch means.

14. A transient voltage surge suppressor module for connection in a single or poly-phase power distribution network, said module being connectable in parallel between neutral and ground, and said module comprising:

an electrical circuit for monitoring the integrity of surge protection components in a neutral-to-ground path and for providing an indication of the loss of surge protection due to an excessive surge or transient said circuit including;

a metal oxide varistor (MOV) connected in said ground-to-neutral path, said MOV normally non-conducting but being switched into conduction when the voltage threshold is exceeded by a transient voltage, and the MOV failing if the surge or transient is excessive;

first and second fuse means series connected with said MOV, both said fuse means clearing upon failure of the MOV to create an open circuit neutral-to-ground path; and, lamp means for providing an indication of the loss of surge protection when an excessive surge or transient has occurred, and switch means for controlling operation of said lamp means, said switch means normally maintaining said lamp means in a light emitting state but switching said lamp means to a non-emitting state in response to the loss of surge protection due to the occurrence of an excessive surge or transient.

15. The module of claim 14 wherein each said fuse means comprises a fuse link, each fuse link being formed of a 99.9% pure silver wire.

16. The module of claim 14 wherein each said fuse means comprises a fuse link, one side of said MOV is connected to one of said ground or neutral, and said fuse links are concatenated with one end of one of said fuse links being connected to a second side of said MOV and with one end of the other of said fuse links being connected to the other of said neutral or ground.

17. The module of claim 16 wherein said lamp means comprises a light emitting diode (LED) and a transistor for controlling current flow through the LED.

18. The module of claim 17 wherein said switch means includes an opto-isolator whose output is connected to said transistor means, said opto-isolator, when conducting, switching said transistor into conduction causing the LED to emit light.

19. The module of claim 18 wherein one side of said opto-isolator is connected to a power source, and the other side thereof is connected in said ground-to-neutral path at a common point between said fuse links whereby clearing of the fuse links creates an open circuit for said opto-isolator, said opto-isolator going out of conduction when said open circuit occurs thereby taking said transistor out of conduction and causing the LED to stop emitting light.

20. The module of claim 14 further including rectification means for providing an indication logic bias for said lamp means.

21. The module of claim 14 further including source means for producing a constant current source for said switch means.

22. An electrical circuit for use in a transient voltage surge suppressor connected in parallel with a path between neutral and ground in a single or poly-phase power distribution network, said circuit monitoring integrity of surge protection components in said neutral-to-ground path and providing an indication of the loss of surge protection due to excessive surge or transient, said circuit comprising;
- a metal oxide varistor (MOV) connected in series in said ground-to-neutral path, said MOV normally non-conducting but being switched into conduction when the voltage threshold is exceeded by a transient voltage, and the MOV failing if the surge or transient is excessive;
- first and second fuse links series connected with said MOV, one side of said MOV being connected to one of said ground or neutral, said fuse links being concatenated with one end of one of said fuse links being connected to a second side of said MOV and with one end of the other of said fuse links being connected to the other of said neutral or ground, and both said fuse links clearing upon failure of the MOV to create an open circuit neutral-to-ground path; and,
- lamp means for providing an indication of loss of surge protection when an excessive surge or transient has occurred, and switch means for controlling operation of said lamp means, said switch means normally maintaining said lamp means in a light emitting state but switching said lamp means to a non-emitting state in response to the loss of surge protection due to the occurrence of an excessive surge or transient.

23. The circuit of claim 22 wherein said lamp means comprises a light emitting diode (LED) and a transistor for controlling current flow through the LED.

24. The circuit of claim 23 wherein said switch means includes an opto-isolator whose output is connected to said transistor means, said opto-isolator, when conducting, switching said transistor into conduction causing the LED to emit light.

25. The circuit of claim 24 wherein one side of said opto-isolator is connected to a power source, and the other side thereof is connected in said ground-to-neutral path at a common point between said fuse links whereby clearing of the fuse links creates an open circuit for said opto-isolator, said opto-isolator going out of conduction when said open circuit occurs thereby taking said transistor out of conduction and causing the LED to stop emitting light.

26. The circuit of claim 25 further including rectification means for providing an indication logic bias for said LED.

27. The circuit of claim 26 further including source means for producing a constant current source for said switch means.

28. An electrical circuit for use in a transient voltage surge suppressor connected in parallel with a path between neutral and ground in a single or poly-phase power distribution network, said circuit monitoring the integrity of surge protection components in said neutral-to-ground path and providing an indication of the loss of surge protection due to an excessive surge or transient, said circuit comprising:
- a metal oxide varistor (MOV) connected in series in said ground-to-neutral path, said MOV normally non-conducting but being switched into conduction when the voltage threshold is exceeded by a transient voltage, and the MOV failing if the surge or transient is excessive;
- first and second fuse links series connected with said MOV, one side of said MOV being connected to one of said ground or neutral, said fuse links being concatenated with one end of one of said fuse links being connected to a second side of said MOV and with one end of the other of said fuse links being connected to the other of said neutral or ground, and both said fuse links clearing upon failure of the MOV to create an open circuit neutral-to-ground path; and,
- an LED providing a visual indication of the loss of surge protection when an excessive surge or transient has occurred, said LED being connected in a circuit path extending between two phases or a phase and neutral;
- constant current source means also connected in said circuit path between the phases for providing a substantially constant electrical current to said LED;
- transistor means also connected in said circuit path between said phases, said transistor means being interposed between said constant current source and said LED to control current flow to said LED; and,
- switch means for switching said transistor means into and out of conduction thereby to control operation of said LED, said switch means including an opto-isolator having an input circuit path one side of which is connected to said circuit path between said phases, another side of which is connected in said neutral-to-ground path, and an output circuit path which is connected to said transistor means, said switch means normally maintaining said transistor means in a conducting state in which current flows through said transistor means to said LED, but clearing of said fuse links opening input circuit path of said opto-isolator and causing said opto-isolator to switch said transistor means to its non-conducting state thereby disrupting current flow to said LED.

29. The electrical circuit of claim 28 wherein said another side of said input circuit path for said opto-isolator is connected to a common connection point between said series connected fuse links.

* * * * *